(12) United States Patent
Shin et al.

(10) Patent No.: US 11,081,289 B2
(45) Date of Patent: Aug. 3, 2021

(54) TANTALUM CAPACITOR

(71) Applicant: SAMSUNG ELECTRO-MECHANICS CO., LTD., Suwon-si (KR)

(72) Inventors: Hong Kyu Shin, Suwon-si (KR); Young June Lee, Suwon-si (KR); Hun Chol Jung, Suwon-si (KR); Yu Jin Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 2 days.

(21) Appl. No.: 16/594,262

(22) Filed: Oct. 7, 2019

(65) Prior Publication Data

US 2020/0168405 A1   May 28, 2020

(30) Foreign Application Priority Data

Nov. 22, 2018 (KR) .......................... 10-2018-0145455

(51) Int. Cl.
*H01G 9/10* (2006.01)
*H01G 9/048* (2006.01)
(Continued)

(52) U.S. Cl.
CPC ............... *H01G 9/10* (2013.01); *H01G 9/012* (2013.01); *H01G 9/042* (2013.01)

(58) Field of Classification Search
CPC .......... H01G 9/10; H01G 9/042; H01G 9/012; H01G 9/008
See application file for complete search history.

(56) References Cited

U.S. PATENT DOCUMENTS

| 6,236,561 | B1 * | 5/2001 | Ogino ................... | H01G 9/012 361/301.3 |
| 7,190,571 | B2 * | 3/2007 | Heusmann ............. | H01G 9/012 361/523 |

(Continued)

FOREIGN PATENT DOCUMENTS

| CN | 1242585 A | 1/2000 |
| CN | 1617271 A | 5/2005 |

(Continued)

OTHER PUBLICATIONS

Chinese Office Action dated Jun. 3, 2021 issued in Chinese Patent Application No. 201911153033.9 (with English translation).

*Primary Examiner* — Nathan Milakovich
(74) *Attorney, Agent, or Firm* — Morgan, Lewis & Bockius LLP

(57) ABSTRACT

A tantalum capacitor includes: a tantalum body comprising tantalum powder and a tantalum wire exposed to one end surface; an anode lead frame comprising a first electrode member and a second electrode member bent perpendicularly thereto; a cathode electrode lead frame comprising a third electrode member spaced apart from the first electrode member having the tantalum body mounted on an upper surface thereof and a fourth electrode member bent perpendicularly thereto; and a encapsulation portion covering the tantalum body so that lower surfaces of the first and third electrode members and one external surfaces of the second and fourth electrode members are exposed. The anode lead frame comprises a bend portion having a connection part of the first electrode member and the second electrode member as an axis, and an end of the bend portion is in contact with the tantalum wire.

13 Claims, 3 Drawing Sheets

(51) Int. Cl.
*H01G 9/012* (2006.01)
*H01G 9/042* (2006.01)

(56) References Cited

U.S. PATENT DOCUMENTS

| | | | | |
|---|---|---|---|---|
| 7,352,562 B2* | 4/2008 | Tanaka | ............ | H01G 2/065 |
| | | | | 361/540 |
| 7,656,647 B2* | 2/2010 | Edson | ............ | H01G 2/065 |
| | | | | 361/540 |
| 7,974,077 B2* | 7/2011 | Matsuoka | ........ | H01G 9/14 |
| | | | | 361/540 |
| 7,990,686 B2* | 8/2011 | Matsuoka | ........ | H01G 9/04 |
| | | | | 361/540 |
| 8,125,769 B2* | 2/2012 | Djebara | .......... | H01G 9/15 |
| | | | | 361/540 |
| 8,848,343 B2* | 9/2014 | Jacobs | ............ | H01G 9/10 |
| | | | | 361/540 |
| 9,711,294 B2 | 7/2017 | Shin et al. | | |
| 10,312,027 B2 | 6/2019 | Kato et al. | | |
| 2005/0002148 A1 | 1/2005 | Ishijima | | |
| 2005/0105248 A1 | 5/2005 | Oh et al. | | |
| 2007/0253147 A1 | 11/2007 | Marek et al. | | |
| 2014/0043730 A1* | 2/2014 | Kim | ............ | H01G 9/052 |
| | | | | 361/529 |
| 2015/0077904 A1* | 3/2015 | Kwak | ........ | H01G 9/0029 |
| | | | | 361/528 |
| 2016/0093447 A1* | 3/2016 | Kato | ............ | H01G 9/15 |
| | | | | 361/540 |
| 2021/0043391 A1* | 2/2021 | Jung | ............ | H01G 9/008 |

FOREIGN PATENT DOCUMENTS

| | | |
|---|---|---|
| CN | 105469995 A | 4/2016 |
| EP | 0966007 A1 | 12/1999 |
| JP | 2005-26635 A | 1/2005 |
| JP | 2007-300123 A | 11/2007 |

* cited by examiner

I – I'

US 11,081,289 B2

TANTALUM CAPACITOR

CROSS-REFERENCE TO RELATED APPLICATION(S)

This application claims the benefit of priority to Korean Patent Application No. 10-2018-0145455 filed on Nov. 22, 2018 in the Korean Intellectual Property Office, the disclosure of which is incorporated herein by reference in its entirety.

TECHNICAL FIELD

The present disclosure relates to a tantalum capacitor.

BACKGROUND

Tantalum capacitors are electronic components used in passive component-intensive products such as TVs, mobile phones, laptops, tablet PCs, automotive application components or the like.

Recently, tantalum capacitors having an integrated frame structure directly connecting a lower surface electrode, used as a terminal, to a tantalum body and a tantalum wire, in order to increase capacity without using an additional connection frame, have been disclosed.

Conventional tantalum capacitors having the integrated frame structure, however, cannot fully utilize the space of a part to which the tantalum wire is connected, thereby limiting the obtainable increase in capacity. Further, as the frame is only formed on a lower surface of the product, electrical connectivity may be reduced when mounting a substrate.

In order to connect the tantalum wire and the frame, force needs to be applied in a vertical direction when welding. However, there may be delamination of the tantalum body. In addition, problems such as deteriorated LC characteristics of the product, or the like, may be caused due to residual welding stress.

SUMMARY

An aspect of the present disclosure is to provide a tantalum capacitor capable of improving capacity and electrical connectivity when mounting a substrate while preventing generation of a delamination of a tantalum body during the connection of a tantalum wire and a frame and reducing welding stress.

According to an aspect of the present disclosure, a tantalum capacitor includes a tantalum body comprising tantalum powder and a tantalum wire exposed to one end surface; an anode lead frame comprising a first electrode member and a second electrode member bent perpendicularly thereto; a cathode electrode lead frame comprising a third electrode member spaced apart from the first electrode member having the tantalum body mounted on an upper surface thereof and a fourth electrode member bent perpendicularly thereto; and a encapsulation portion covering the tantalum body so that lower surfaces of the first and third electrode members and external surfaces of the second and fourth electrode members are exposed. The anode lead frame comprises a bend portion having a connection part of the first electrode member and the second electrode member as an axis, and an end of the bend portion is in contact with the tantalum wire.

In an embodiment, the anode lead frame may have a groove formed at the end of the bend portion so that the tantalum wire may be fitted into the bend portion.

In an embodiment, the groove of the bend portion may be U-shaped.

In an embodiment, the groove of the bend portion may be semicircular.

In an embodiment, the groove of the bend portion may be in the shape of V.

In an embodiment, the anode lead frame may include a step formed on the upper surface of the first electrode member.

In an embodiment, the cathode lead frame may include a step formed on the lower surface of the third electrode member.

In an embodiment, the tantalum capacitor may further include a conductive adhesive layer disposed between the capacitor body and the third electrode member of the cathode lead frame.

In an embodiment, a groove part may be formed on the second electrode member of the anode lead frame.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
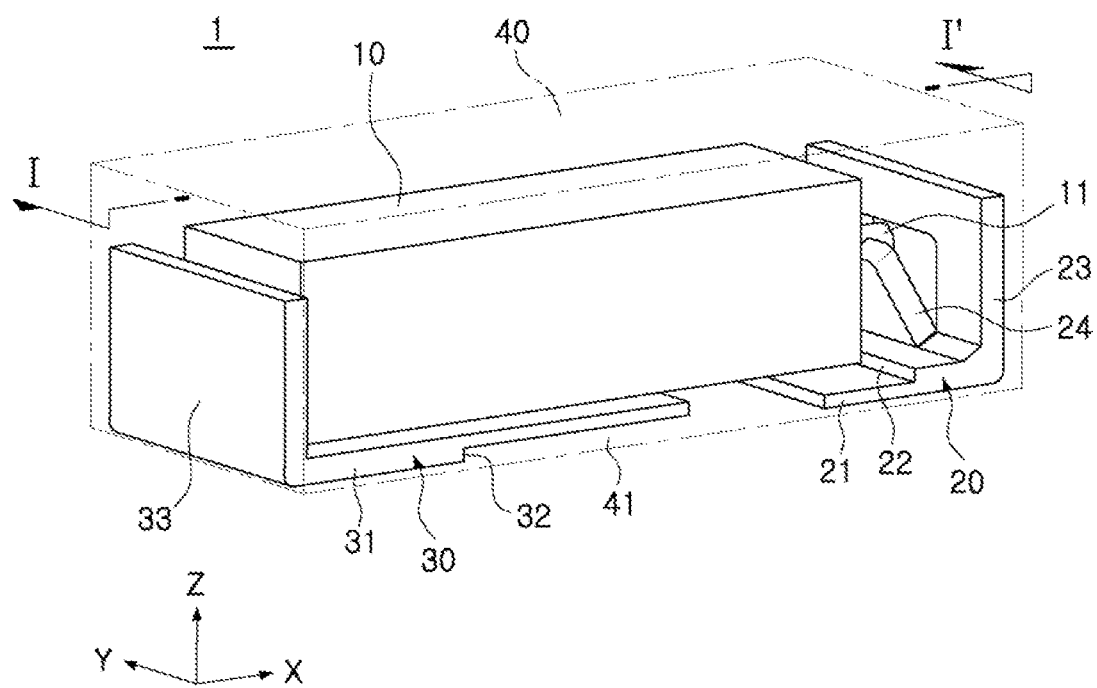
FIG. 1 is a transparent perspective view of a schematically illustrated tantalum capacitor according to an embodiment of the present disclosure.

Hereinafter, embodiments of the present disclosure will be described as follows with reference to the attached drawings.

However, the invention may be embodied in many different forms and should not be construed as being limited to the embodiments set forth herein.

Rather, these embodiments are provided so that this disclosure will be thorough and complete, and will fully convey the scope of the invention to those skilled in the art.

The shapes and dimensions of elements in the drawings may be exaggerated for clarity.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another example embodiment without departing from the spirit and scope of the present disclosure. Shapes and sizes of elements in the drawings may be exaggerated for clarity of description, and the same elements will be indicated by the same reference numerals.

For clarity of description, some elements may be omitted or briefly illustrated, and thicknesses of elements may be magnified to clearly represent layers and regions. It will be understood that when a portion "includes" an element, it can further include another element, not excluding another element, unless otherwise indicated.

Further, directions will be defined in order to clearly describe embodiments of the present disclosure. "X", "Y" and "Z" illustrated in the drawings refer to "a length direction," "a width direction," and "a thickness direction," respectively, of the tantalum capacitor and tantalum body.

A direction in which a tantalum wire is exposed from of the tantalum body is defined as the front direction of the tantalum body, a direction opposite to the front of the tantalum body is defined as the rear direction of the tantalum body, directions perpendicularly intersecting with the front and rear of the tantalum body are defined as both sides of the tantalum body, and both surfaces of the tantalum body in the thickness direction are defined as an upper surface and a lower surface (or a mounting surface) of the tantalum body.

However, these directions are defined for convenience of explanation, and the claims are not particularly limited by the directions defined as described above.

The meaning of a "connection" of a component to another component in the description includes an indirect connection through an adhesive layer as well as a direct connection between two components. In addition, "electrically connected" means the concept including a physical connection and a physical disconnection. It can be understood that when an element is referred to with "first" and "second", the element is not limited thereby. The terms "first," "second," etc. may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

Terms used herein are used only in order to describe an exemplary embodiment rather than limiting the present disclosure. In this case, singular forms include plural forms unless interpreted otherwise in context.

Figure 2:
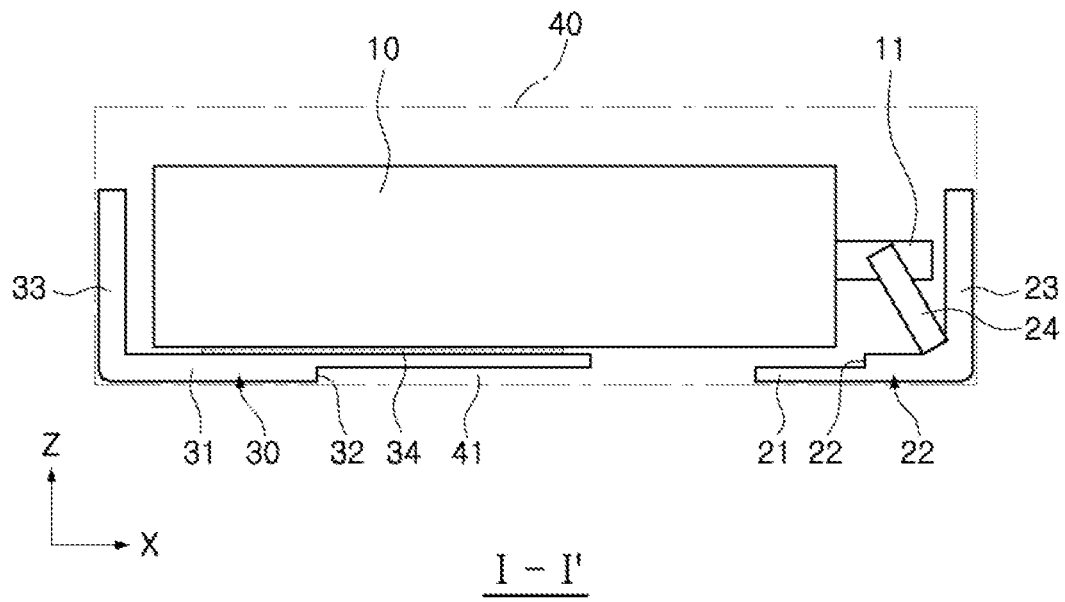
FIG. 2 is a cross-sectional view taken along line I-I' in FIG. 1.
Figure 3:
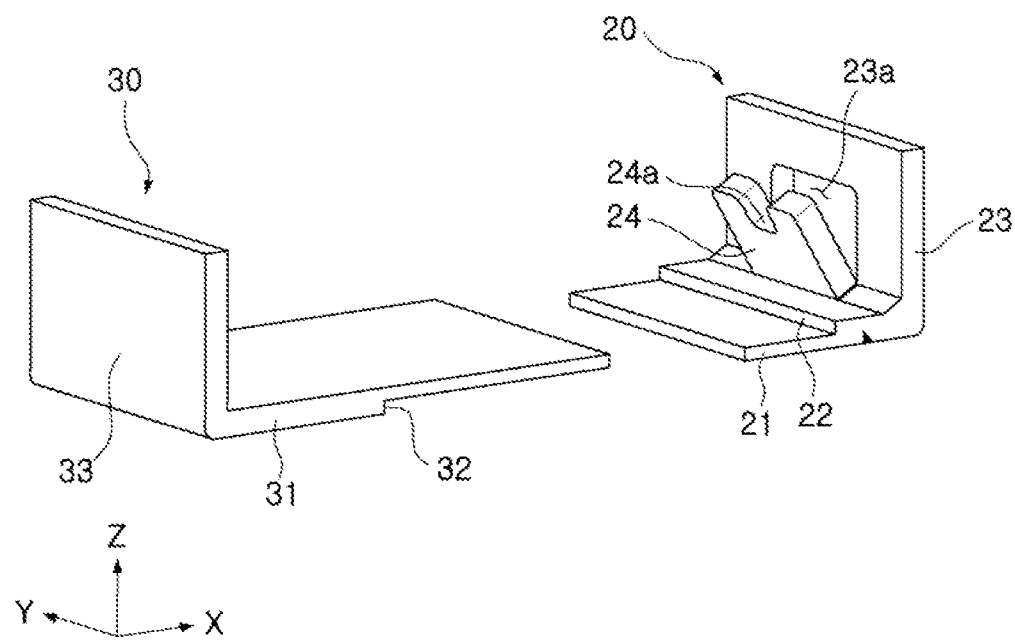
FIG. 3 is a perspective view of an anode lead frame and a cathode lead frame of FIG. 1.

FIG. 1 is a transparent perspective view of a schematically illustrated tantalum capacitor according to an embodiment of the present disclosure, while FIG. 2 is a cross-sectional view taken along line I-I' in FIG. 1, while FIG. 3 is a perspective view of an anode lead frame and a cathode lead frame of FIG. 1.

Referring to FIGS. 1 to 3, the tantalum capacitor 1 includes a tantalum body 10; an anode lead frame 20; a cathode electrode lead frame 30 and an encapsulation portion 40.

The tantalum body 10 is formed using a tantalum material. As an example, tantalum powder and a binder are mixed at a certain ratio and stirred. The mixed powder is compressed and molded in a substantially cuboid shape, followed by sintering at a high temperature under high vacuum, to prepare a tantalum body.

In addition, the tantalum body 10 includes a tantalum wire 11 exposed to an end surface in the front direction.

The tantalum wire 11 may be inserted into the mixture of the tantalum powder and the binder may be off-centered within the body, before the mixed powder of the tantalum powder and binder is compressed.

That is, the tantalum body 10 can be manufactured by molding a tantalum element in a desired size by inserting the tantalum wire 11 into the tantalum powder mixed with the binder and sintering the tantalum element at a high temperature under high vacuum ($10^{-5}$ torr or less) for about 30 minutes.

The anode lead frame 20 may be formed of conductive metals such as a nickel/iron alloy, or the like, and includes the first electrode member 21, the second electrode member 23 and the bend portion 24, which are integrally formed.

The first electrode member 21 is a part exposed to the lower surface of the encapsulation portion 40 functioning as a terminal when mounting a substrate.

The second electrode member 23 is a part bent and extending in the Z direction, perpendicular to a distal end of the first electrode member 21. One external surface in the X direction is exposed through one end surface of the encapsulation portion 40 so that a solder is joined when mounting a substrate, thereby improving electrical connectivity.

If necessary, the second electrode member 23 may further include a lid part bent and extruded in the X direction from the top. The lid part may be used as a connection terminal when mounting a substrate.

Additionally, the anode lead frame 20 may include a step 22 formed on an upper surface of the first electrode member 21.

When the encapsulation portion 40 is formed, such a step 22 may be filled with resin, or the like. The resin improves adhesion strength of the anode lead frame 20 and prevents cracks.

The bend portion 24 is a part formed to obliquely extrude toward the tantalum wire 11 about an axis of a connection part of the first electrode member 21 and the second electrode member 23 and may be electrically connected to the tantalum wire 11 at end parts thereof.

As the end parts of the bend portion 24 are obliquely in contact with the tantalum wire 11 about the axis of the connection part of the first electrode member 21 and the second electrode member 23, the tantalum wire 11 may be shortened. In this regard, a space is secured between one end surface of the tantalum body 10 and that of the encapsulation portion 40.

Further, in an embodiment, as the tantalum wire 11 is obliquely in contact and joined to the bend portion 24. As the welding is carried out by applying force in an oblique direction of the bend portion 24, delamination of the tantalum body 10 can be prevented, and deterioration of LC characteristics, or the like, of the tantalum capacitor 1 can be prevented by preventing residual stress of welding.

It is preferable that the welding may be performed by an electric spot welding method, but is not limited thereto.

Such bend portion 24 can be formed by punching or cutting a part of the second electrode member 23. In this regard, a groove part 23a can be formed in the second electrode member 23.

When the encapsulation portion 40 is formed, the groove part 23a is filled with resin, or the like. While forming a part of the encapsulation portion 40, the resin improves adhesion strength of the anode lead frame 20.

In addition, there may be a groove 24a formed in the end of the bend portion 24 so that a delamination of the tantalum body 10 is further prevented and welding stress can be reduced when welding the tantalum wire 11.

The groove 24a increases a contact surface area of the bend portion 24 and the tantalum wire 11 so that more stable welding can be performed and reduction in the electrical connectivity can be prevented.

The cathode lead frame 30 may be formed of conductive metals such as a nickel/iron alloy or the like, and includes the third electrode member 31 and the fourth electrode member 33, which are integrally formed.

The third electrode member 31 is parallelly spaced apart from the first electrode member 21 of the anode lead frame 20 in the X direction, is electrically connected to the tantalum body 10, which is mounted on the upper surface thereof, and is exposed through the lower surface of the encapsulation portion 40, and thus can function as a terminal.

The fourth electrode member 33 is a part bent and extending in the Z direction perpendicular to a distal end of the third electrode member 31. One external surface in the X direction is exposed through one end surface of the encapsulation portion 40 so that a solder is joined when mounting a substrate, thereby improving electrical connectivity.

If necessary, the fourth electrode member 33 may further include a lid part bent and extruding in the X direction from the top. The lid part may be used as a connection terminal when mounting a substrate.

Additionally, the cathode lead frame 30 may include a step 32 formed on a lower surface of the third electrode 31.

When the encapsulation portion 40 is formed, such step 32 may be filled with resin 41, or the like. While forming a part of the encapsulation portion 40, the resin improves adhesion strength of the cathode lead frame 30 and prevents cracks.

A conductive adhesion layer 34 may be formed between the third electrode member 31 of the cathode lead frame 30 and the tantalum body 10 in order to improve adhesion strength of the cathode lead frame 30.

Such conductive adhesion layer 34 may consist of certain amounts of conductive adhesives including epoxy-based thermosetting resin and conductive metal powder, where the conductive adhesives are dispensed or point-dotted.

Further, silver (Ag) may be used for the conductive metal powder, but it is not limited thereto.

The encapsulation portion 40 may be formed by transfer-molding resin such as epoxy molding compound (EMC) or the like so as to surround the tantalum body 10.

The encapsulation portion 40 protects the tantalum wire 11 and the tantalum body 10 from outside.

Further, the encapsulation portion 40 is formed so that the lower surface of the first electrode member 21 of the anode lead frame 20 and that of the third electrode member 31 of the cathode lead frame 30 are exposed and that one external surface in the X direction of the second electrode member 23 of the cathode lead frame 20 and that of the fourth electrode member 33 of the cathode lead frame 30 are exposed.

The lower surface of the encapsulation portion 40 may be formed to be on one flat surface with that of the first electrode member 21 and that of the third electrode member 31. The one surface in the X direction of the encapsulation portion 40 may be formed to be on one flat surface with the one external surface of the second electrode member 23, whereas the other surface in the X direction of the encapsulation portion 40 may be formed to be on one flat surface with the one of the fourth electrode 33.

Figure 4:
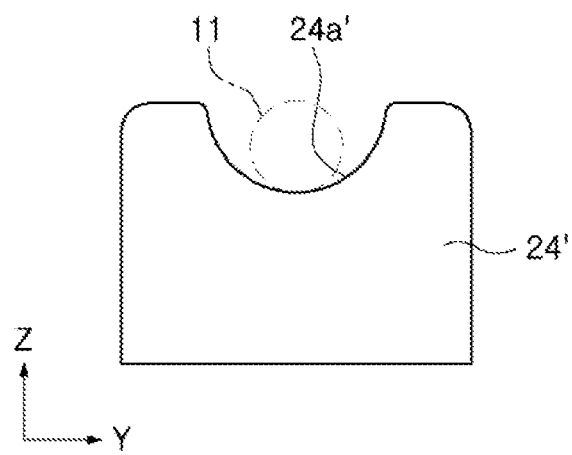
FIG. 4 is a front view of another embodiment of a bend portion of the anode lead frame.

Meanwhile, the groove 24a of the bend portion 24 in the cathode lead frame 20 of the embodiment is illustrated as a U shape, but is not limited thereto. If necessary, the groove 24a' of the bend portion 24' may be in a semicircular shape as illustrated in FIG. 4.

When the groove 24a' of the bend portion 24' is formed in the semicircular shape, a surface area in contact with the tantalum wire 11 increases, thereby increasing electrical connectivity as well as reliability.

Figure 5:
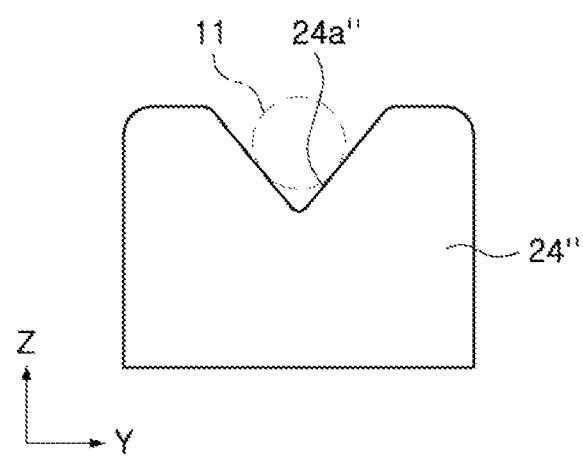
FIG. 5 is a front view of still another embodiment of a bend portion of the anode lead frame.

Meanwhile, as illustrated in FIG. 5, the groove 24a'' of the bend portion 24'' may have a V shape. In this case, the tantalum wire 11 makes point contact with the groove 24a'', giving rise to further reduced stress during welding.

According to an embodiment of the present disclosure, greater capacity of the capacitor can be secured by elongating the tantalum body as the tantalum wire is shortened in length. Additionally, as the anode lead frame includes a second electrode member extending perpendicularly to the first electrode member functioning as a lower surface electrode and the cathode lead frame includes a fourth electrode member extending perpendicularly to the third electrode member functioning as a lower surface electrode, electrical connectivity can be improved when mounting a substrate.

Further, as the tantalum wire obliquely in contact with the bend portion is welded and joined, a delamination of the tantalum body can be prevented and welding stress can be reduced.

While embodiments have been shown and described above, it will be apparent to those skilled in the art that modifications and variations could be made without departing from the scope of the present disclosure as defined by the appended claims.

What is claimed is:

1. A tantalum capacitor, comprising:
a tantalum body comprising tantalum powder and a tantalum wire exposed to one end surface of the tantalum body;
an anode lead frame comprising a first electrode member, a second electrode member bent perpendicularly to the first electrode member, and a bend portion having a connection part of the first electrode member and the second electrode member as an axis, an end of the bend portion contacting the tantalum wire;
a cathode electrode lead frame comprising a third electrode member spaced apart from the first electrode member having the tantalum body mounted on an upper surface of the third electrode member, and a fourth electrode member bent perpendicularly to the third electrode member and facing the second electrode member; and
an encapsulation portion covering the tantalum body so that lower surfaces of the first and third electrode members and external surfaces of the second and fourth electrode members are exposed,
wherein the second electrode member comprises a groove part forming a hole in the second electrode member, the hole having a shape corresponding to the bend portion.

2. The tantalum capacitor of claim 1, wherein the anode lead frame has a groove formed at the end of the bend portion so that the tantalum wire is fitted into the bend portion.

3. The tantalum capacitor of claim 2, wherein the groove of the bend portion is U-shaped.

4. The tantalum capacitor of claim 2, wherein the groove of the bend portion is semicircular.

5. The tantalum capacitor of claim 2, wherein the groove of the bend portion is V-shaped.

6. The tantalum capacitor of claim 1, wherein the anode lead frame comprises a step formed on the upper surface of the first electrode member.

7. The tantalum capacitor of claim 6, wherein the encapsulation portion comprises a resin, and the resin is disposed in the step formed on the upper surface of the first electrode member.

8. The tantalum capacitor of claim 1, wherein the cathode lead frame comprises a step formed on the lower surface of the third electrode member.

9. The tantalum capacitor of claim 8, wherein the encapsulation portion comprises a resin, and the resin is disposed in the step formed on the lower surface of the third electrode member.

10. The tantalum capacitor of claim 1, further comprising a conductive adhesive layer disposed between the capacitor body and the third electrode member of the cathode lead frame.

11. The tantalum capacitor of claim 1, wherein the encapsulation portion comprises a resin, and the resin is disposed in the groove part formed on the second electrode member of the anode lead frame.

12. A tantalum capacitor, comprising:
a tantalum body comprising tantalum powder and a tantalum wire exposed to one end surface of the tantalum body;
an anode lead frame comprising a first electrode member, a second electrode member bent perpendicularly to the first electrode member, and a bend portion disposed at an edge connecting the first electrode member and the second electrode member and extending at an angle inwardly toward the tantalum body, an end of the bend portion contacting the tantalum wire;
a cathode electrode lead frame comprising a third electrode member spaced apart from the first electrode member having the tantalum body mounted on an upper surface of the third electrode member, and a fourth electrode member bent perpendicularly to the third electrode member and facing the second electrode member; and
an encapsulation portion covering the tantalum body so that lower surfaces of the first and third electrode members and external surfaces of the second and fourth electrode members are exposed,
wherein the encapsulation portion is exposed through a groove part formed in the second electrode member.

13. The tantalum capacitor of claim 12, wherein the groove part formed in the second electrode member has a shape corresponding to the bend portion.

* * * * *